(12) United States Patent
Buie et al.

(10) Patent No.: US 12,287,307 B2
(45) Date of Patent: Apr. 29, 2025

(54) DEVICES INCORPORATING MULTILANE FLOW CELL

(71) Applicant: LIFE TECHNOLOGIES CORPORATION, Carlsbad, CA (US)

(72) Inventors: Creighton Buie, Daly City, CA (US); Mark Reed, Menlo Park, CA (US); Albert Carrillo, South San Francisco, CA (US)

(73) Assignee: Life Technologies Corporation, Carlsbad, CA (US)

( * ) Notice: Subject to any disclaimer, the term of this patent is extended or adjusted under 35 U.S.C. 154(b) by 1223 days.

(21) Appl. No.: 16/994,202

(22) Filed: Aug. 14, 2020

(65) Prior Publication Data

US 2021/0055255 A1     Feb. 25, 2021

Related U.S. Application Data

(60) Provisional application No. 62/890,060, filed on Aug. 21, 2019.

(51) Int. Cl.
*G01N 27/414* (2006.01)

(52) U.S. Cl.
CPC .................................. *G01N 27/414* (2013.01)

(58) Field of Classification Search
CPC ......... B01L 3/502715; B01L 3/502746; B01L 2300/0893; B01L 2300/0877; B01L 3/5025; B01L 2300/0816; G01N 27/414; G01N 27/4145
See application file for complete search history.

(56) References Cited

U.S. PATENT DOCUMENTS

| | | | | |
|---|---|---|---|---|
| 5,738,825 A * | 4/1998 | Rudigier | ............... | G01N 21/253 422/82.11 |
| 6,018,388 A * | 1/2000 | Nawracala | ........... | G01N 21/253 422/503 |
| 7,674,435 B2 * | 3/2010 | Pastel | ................... | B01L 3/5085 435/305.3 |
| 7,693,666 B2 * | 4/2010 | Griffith | ............. | B01L 3/502784 702/22 |
| 7,776,609 B2 * | 8/2010 | Pastel | .............. | G01N 35/00594 264/2.6 |
| 8,025,853 B2 * | 9/2011 | Numajiri | ................ | G01N 35/08 422/503 |
| 10,551,295 B2 * | 2/2020 | Bassler | ................. | G01N 21/64 |
| 11,327,087 B2 * | 5/2022 | Linbeck, III | ....... | G01N 35/0098 |

(Continued)

OTHER PUBLICATIONS

PCT/US2020/046481, Search Report and Written Opinion, Nov. 17, 2020, 10 pages.

*Primary Examiner* — Shogo Sasaki
(74) *Attorney, Agent, or Firm* — Xin Gao

(57) ABSTRACT

A sensor device includes a substrate having a die attached to the substrate. The die includes an array of sensors and an array of wells cooperatively disposed over the array of sensors. The array of wells is exposed by the substrate. The sensor device further includes a flow cell secured to the substrate and defining a flow space disposed over the die and accessible to the array of wells. The flow cell defines a plurality of separate volumes. Each separate volume of the plurality of separate volumes has an inlet and an outlet. The plurality of separate volumes are separated by dividers. The dividers cover a set of wells of the array of wells.

7 Claims, 8 Drawing Sheets

(56) References Cited

U.S. PATENT DOCUMENTS

| | | | |
|---|---|---|---|
| 11,517,902 B2* | 12/2022 | Walton | B01L 3/502792 |
| 11,738,345 B2* | 8/2023 | Soto-Moreno | B01L 3/502792 |
| | | | 422/504 |
| 2004/0132214 A1* | 7/2004 | Lin | C40B 30/04 |
| | | | 436/518 |
| 2005/0110989 A1* | 5/2005 | Schermer | G01N 21/553 |
| | | | 356/246 |
| 2005/0170498 A1* | 8/2005 | Dolley | G01N 21/0303 |
| | | | 422/400 |
| 2006/0139641 A1* | 6/2006 | Gollier | G01N 21/7743 |
| | | | 356/399 |
| 2006/0141527 A1* | 6/2006 | Caracci | B01J 19/0046 |
| | | | 435/7.1 |
| 2007/0211245 A1* | 9/2007 | Pastel | G01N 21/0332 |
| | | | 356/246 |
| 2010/0282617 A1 | 11/2010 | Rothberg et al. | |
| 2010/0300895 A1 | 12/2010 | Nobile et al. | |
| 2012/0143531 A1 | 6/2012 | Davey et al. | |

* cited by examiner

DEVICES INCORPORATING MULTILANE FLOW CELL

CROSS-REFERENCE TO RELATED APPLICATION(S)

This application claims benefit of U.S. Provisional Application No. 62/890,060, filed Aug. 21, 2019, which is incorporated herein by reference in its entirety.

FIELD OF THE DISCLOSURE

The present disclosure relates generally to systems and methods for manipulating and analyzing nucleic acids.

BACKGROUND

Increasingly, biological and medical research is turning to nucleic acid sequencing for enhancing biological studies and medicine. For example, biologists and zoologists are turning to sequencing to study the migration of animals, the evolution of species, and the origins of traits. The medical community is using sequencing for studying the origins of disease, sensitivity to medicines, and the origins of infection. As such, sequencing has wide applicability in many aspects of biology, therapeutics, diagnostics, forensics and research.

Nevertheless, the use of sequencing can be limited by assay availability, sequencing run time, preparation time, and cost. Additionally, quality sequencing has historically been an expensive process, thus limiting its practice.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION

In an embodiment, a sensor device, such as a biosensor, includes a die secured to a substrate. The die has a plurality of sensors cooperatively associated with an array of wells. The die is attached to a substrate providing structural support and an electronic interface to the sensors of the die. A flow cell can be attached to the substrate. In an example, the flow cell defines a unified space over the die and includes a single inlet and a single outlet. In another example, the flow cell defines a plurality of separate volumes or lanes, each having an associated inlet and outlet. The separate volumes or lanes are separated by dividers. When the flow cell is attached to the substrate, the dividers are disposed over a set of wells of the array of wells on the die. In particular, the dividers can isolate a set of wells from the separate volumes and thus prevent the use of associated sensors. Optionally, the dividers can be attached to the die using an adhesive. The adhesive can further limit access to the set of wells on the die.

In a further embodiment, a method for manufacturing a sensor device includes providing a substrate having a die having an array of wells. The method can further include selecting a flow cell. In an example, the flow cell can be selected from a flow cell defining a single volume or a flow cell defining lanes over the die. When the selected flow cell defines lanes separated by dividers, the dividers can be disposed over and in proximity to a set of wells of the die. The dividers can limit access to the set of wells, preventing use of associated sensors. In an example, attaching the flow cell to the substrate includes using an adhesive to secure the flow cell dividers to the die. In an alternative example, the flow cell can include elastomeric components that are pressed against the set of wells of the die.

Figure 1:
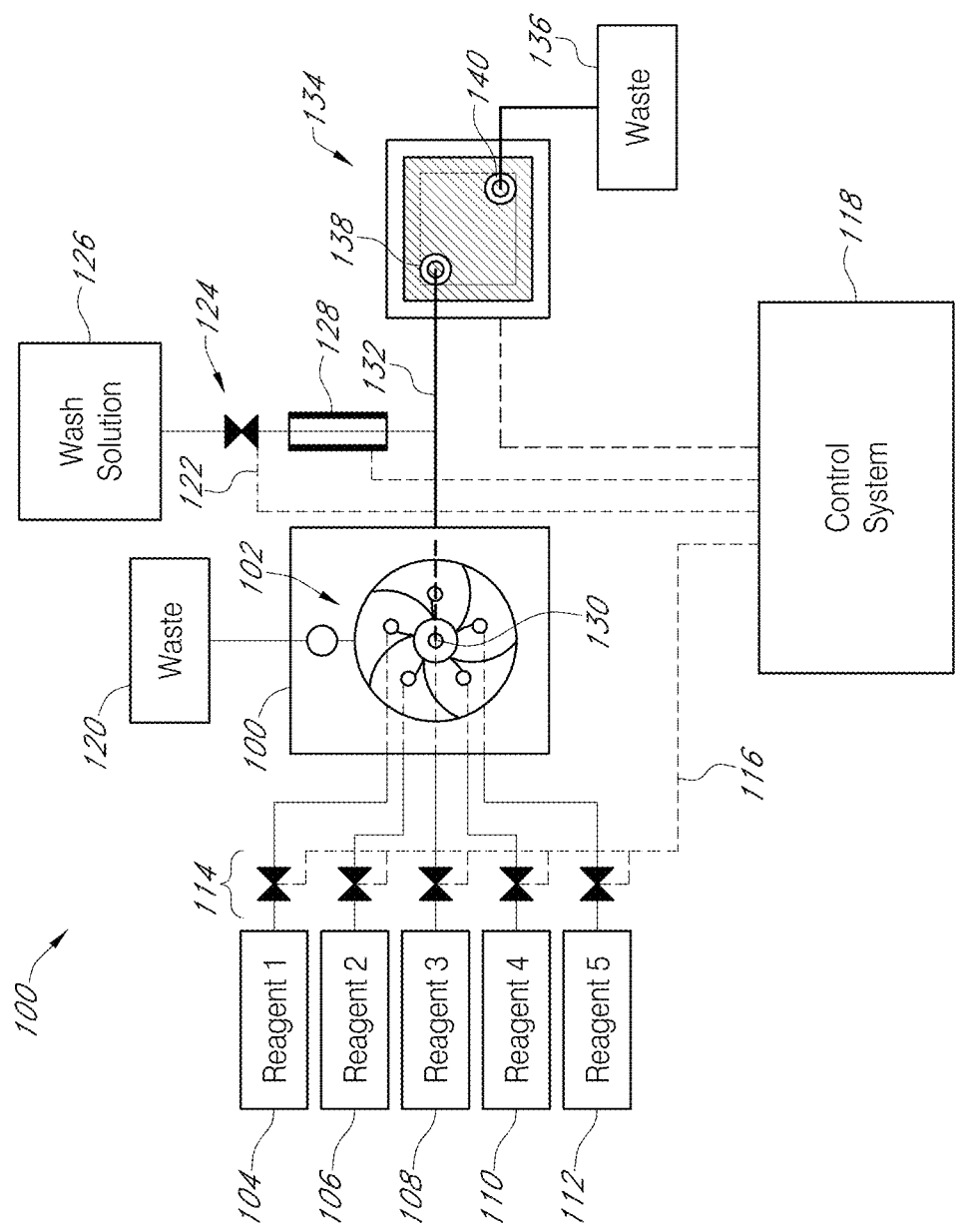
FIG. 1 includes an illustration of an example sequencing system.

Such sensor devices find particular use in sequencing systems. For example, in FIG. 1, a system 100 containing fluidics circuit 102 is connected by inlets to at least two reagent reservoirs (104, 106, 108, 110, or 112), to waste reservoir 120, and to biosensor 134 by fluid pathway 132 that connects fluidics node 130 to inlet 138 of biosensor 134 for fluidic communication. Reagents from reservoirs (104, 106, 108, 110, or 112) can be driven to fluidic circuit 102 by a variety of methods including pressure, pumps, such as syringe pumps, gravity feed, and the like, and are selected by control of valves 114. Reagents from the fluidics circuit 102 can be driven through the valves 114 receiving signals from control system 118 to waste container 120. Reagents from the fluidics circuit 102 can also be driven through the biosensor 134 to the waste container 136. The control system 118 includes controllers for valves, which generate signals for opening and closing via electrical connection 116.

The control system 118 also includes controllers for other components of the system, such as wash solution valve 124 connected thereto by electrical connection 122, and reference electrode 128. Control system 118 can also include control and data acquisition functions for biosensor 134. In one mode of operation, fluidic circuit 102 delivers a sequence of selected reagents 1, 2, 3, 4, or 5 to biosensor 134 under programmed control of control system 118, such that in between selected reagent flows, fluidics circuit 102 is primed and washed, and biosensor 134 is washed. Fluids entering biosensor 134 exit through outlet 140 and are deposited in waste container 136 via control of pinch valve regulator 144. The valve 144 is in fluidic communication with the sensor fluid output 140 of the biosensor 134.

Figure 2:
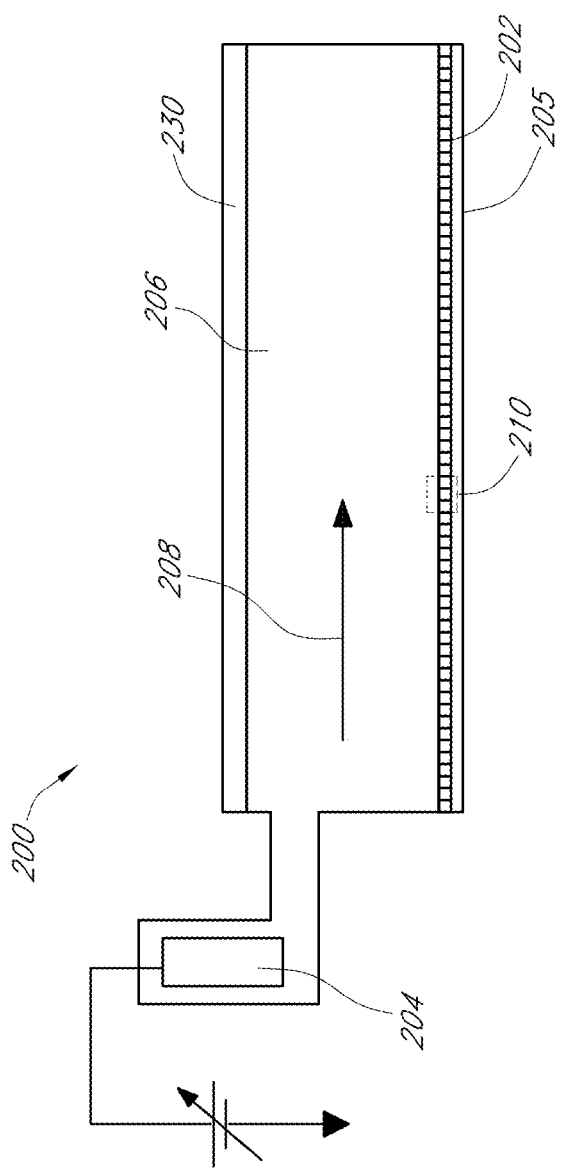
FIG. 2 includes an illustration of an example system including a sensor array.

The sensor device including a dielectric layer defining a well formed from the first access and second access and exposing a sensor pad finds particular use in detecting chemical reactions and byproducts, such as detecting the release of hydrogen ions in response to nucleotide incorporation, useful in genetic sequencing, among other applications. In a particular embodiment, a sequencing system includes a flow cell in which a sensory array is disposed, includes communication circuitry in electronic communication with the sensory array, and includes containers and fluid controls in fluidic communication with the flow cell. In an example, FIG. 2 illustrates an expanded and cross-sectional view of a flow cell 200 and illustrates a portion of a flow chamber 206. A reagent flow 208 flows across a surface of a well array 202, in which the reagent flow 208 flows over the open ends of wells of the well array 202. The well array 202 and a sensor array 205 together may form an integrated unit forming a lower wall (or floor) of flow cell 200. A reference electrode 204 may be fluidly coupled to flow chamber 206. Further, a flow cell cover 230 encapsulates flow chamber 206 to contain reagent flow 208 within a confined region.

Figure 3:
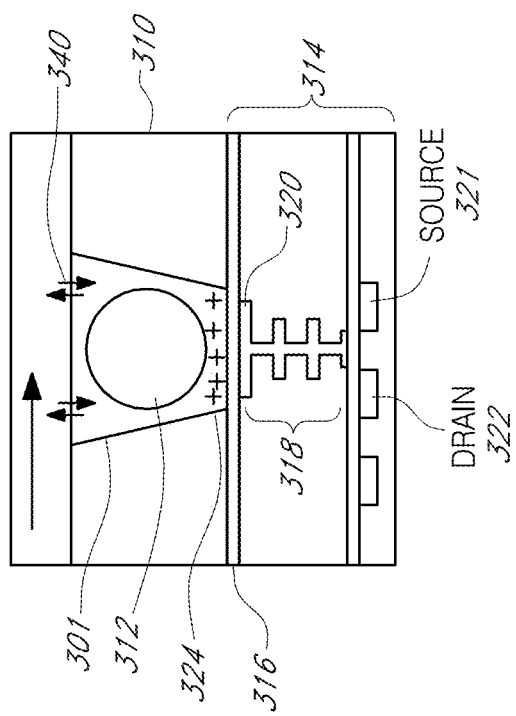
FIG. 3 includes an illustration of an example sensor and associated well.

FIG. 3 illustrates an expanded view of a well 301 and a sensor 314, as illustrated at 210 of FIG. 2. The volume, shape, aspect ratio (such as base width-to-well depth ratio), and other dimensional characteristics of the wells may be selected based on the nature of the reaction taking place, as well as the reagents, byproducts, or labeling techniques (if any) that are employed. The sensor 314 can be a chemical field-effect transistor (chemFET), more specifically an ion-sensitive FET (ISFET), with a floating gate 318 having a sensor plate 320 optionally separated from the well interior by a material layer 316. The sensor 314 can be responsive to (and generate an output signal related to) the amount of a charge 324 present on the material layer 316 opposite the sensor plate 320. The material layer 316 can be a ceramic layer, such as an oxide of zirconium, hafnium, tantalum, aluminum, or titanium, among others, or a nitride of titanium. Alternatively, the material layer 316 can be formed of a metal, such as titanium, tungsten, gold, silver, platinum, aluminum, copper, or a combination thereof. In an example, the material layer 316 can have a thickness in a range of 5 nm to 100 nm, such as a range of 10 nm to 70 nm, a range of 15 nm to 65 nm, or even a range of 20 nm to 50 nm.

While the material layer 316 is illustrated as extending beyond the bounds of the illustrated FET component, the material layer 316 can extend along the bottom of the well 301 and optionally along the walls of the well 301. The sensor 314 can be responsive to (and generate an output signal related to) the amount of a charge 324 present on the material layer 316 opposite the sensor plate 320. Changes in the charge 324 can cause changes in a current between a source 321 and a drain 322 of the chemFET. In turn, the chemFET can be used directly to provide a current-based output signal or indirectly with additional circuitry to provide a voltage-based output signal. Reactants, wash solutions, and other reagents may move in and out of the wells by a diffusion mechanism 340.

The well 301 can be defined by a wall structure, which can be formed of one or more layers of material. In an example, the wall structure can have a thickness extending from the lower surface to the upper surface of the well in a range of 0.01 micrometers to 10 micrometers, such as a range of 0.05 micrometers to 10 micrometers, a range of 0.1 micrometers to 10 micrometers, a range of 0.3 micrometers to 10 micrometers, or a range of 0.5 micrometers to 6 micrometers. In particular, the thickness can be in a range of 0.01 micrometers to 1 micrometer, such as a range of 0.05 micrometers to 0.5 micrometers, or a range of 0.05 micrometers to 0.3 micrometers. The wells 301 of array 202 can have a characteristic diameter, defined as the square root of 4 times the cross-sectional area (A) divided by Pi (e.g., sqrt(4*A/?)), of not greater than 5 micrometers, such as not greater than 3.5 micrometers, not greater than 2.0 micrometers, not greater than 1.6 micrometers, not greater than 1.0 micrometers, not greater than 0.8 micrometers or even not greater than 0.6 micrometers. In an example, the wells 301 can have a characteristic diameter of at least 0.01 micrometers. In a further example, the well 301 can define a volume in a range of 0.05 fL to 10 pL, such as a volume in a range of 0.05 fL to 1 pL, a range of 0.05 fL to 100 fL, a range of 0.05 fL to 10 fL, or even a range of 0.1 fL to 5 fL.

In an embodiment, reactions carried out in the well 301 can be analytical reactions to identify or determine characteristics or properties of an analyte of interest. Such reactions can generate directly or indirectly byproducts that affect the amount of charge adjacent to the sensor plate 320. If such byproducts are produced in small amounts or rapidly decay or react with other constituents, then multiple copies of the same analyte may be analyzed in the well 301 at the same time in order to increase the output signal generated. In an embodiment, multiple copies of an analyte may be attached to a solid phase support 312, either before or after deposition into the well 301. The solid phase support 312 may be microparticles, nanoparticles, beads, solid or porous comprising gels, or the like. For simplicity and ease of explanation, solid phase support 312 is also referred herein as a particle or bead. For a nucleic acid analyte, multiple, connected copies may be made by rolling circle amplification (RCA), exponential RCA, or like techniques, to produce an amplicon without the need of a solid support.

Figure 4:
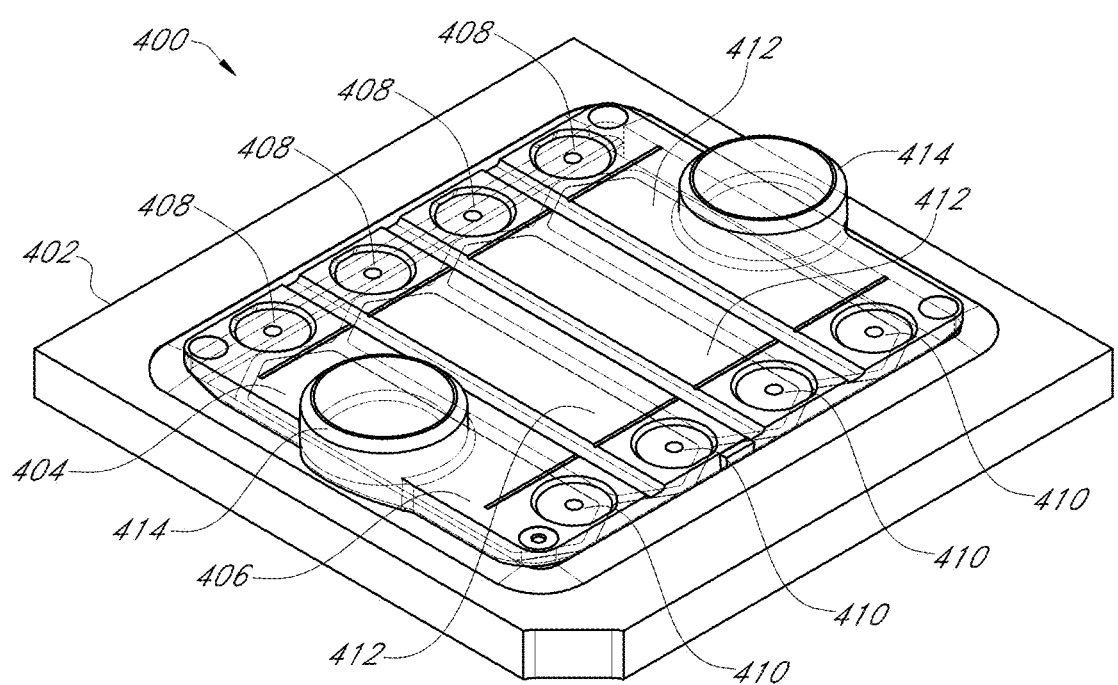
FIG. 4 and FIG. 5 include illustrations of an example sensor device.
Figure 5:
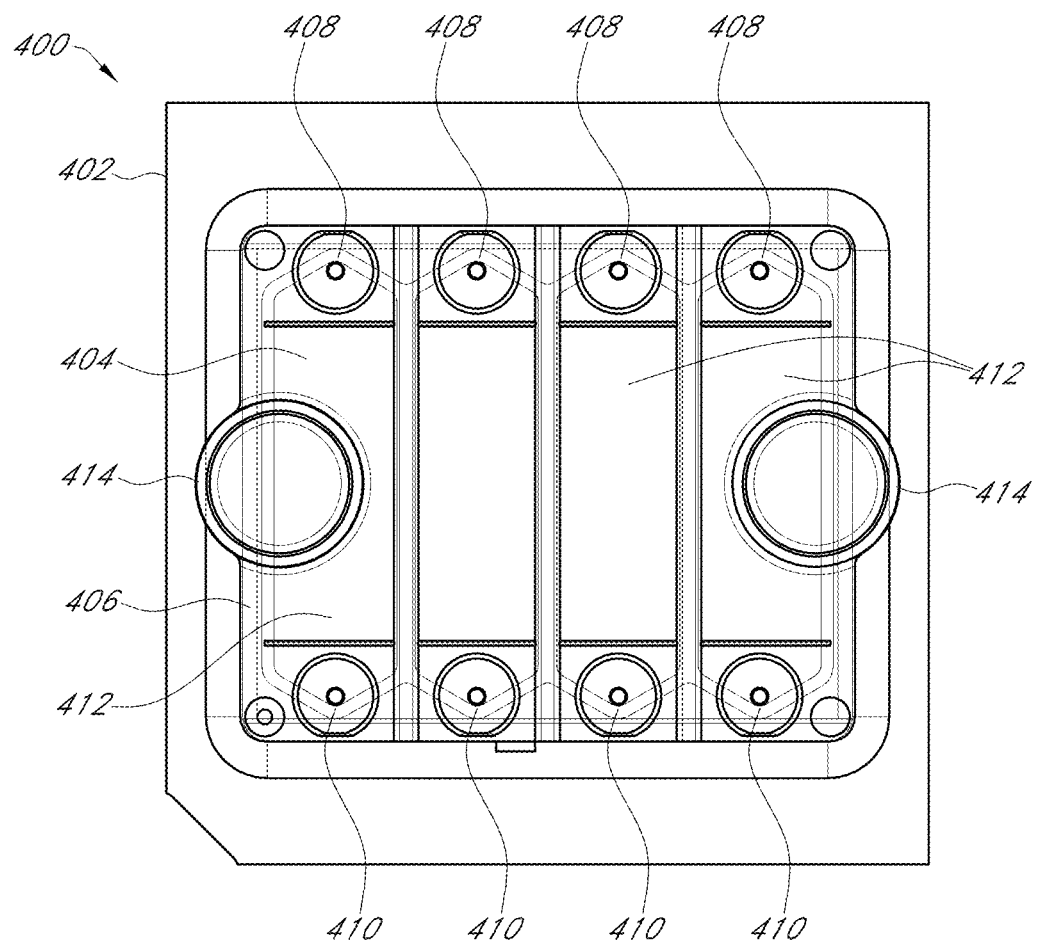

In an example, the biosensor is an example of a sensor device. FIG. 4 and FIG. 5 illustrate an example sensor device 400, such as a microchip including a flow cell. For example, the sensor device 400 includes a substrate 402 securing a die 404 that has a plurality of microwells in fluid communication with a sensor array. A flow cell 406 is secured over the substrate, providing a volume over the die 404.

In an example, the flow cell 406 includes a set of fluid inlets 408 and a set of fluid outlets 410. In particular, the flow cell can be divided into lanes 412. Each lane 412 is individually accessed by a respective fluid inlet 408 and fluid outlet 410.

As illustrated, the sensor device 400 includes four lanes 412. Alternatively, the sensor device 400 can include less than four lanes or more than four lanes. For example, the sensor device 400 can include between 1 and 10 lanes, such as between 2 and 8 lanes, or 4 to 6 lanes. The lanes 412 can be fluidically isolated from each other. As such, the lanes 412 can be used at separate times, concurrently, or simultaneously, depending upon aspects of a run plan.

The sensor device 400 can further include guide structures 414, for example, formed as part of the flow cell 406, to engage complementary structures on a fluidic coupler. Such guide structures 414 assist with aligning the fluid inlets 408 and fluid outlet 410 with associated ports on a fluidic coupler.

Figure 6:
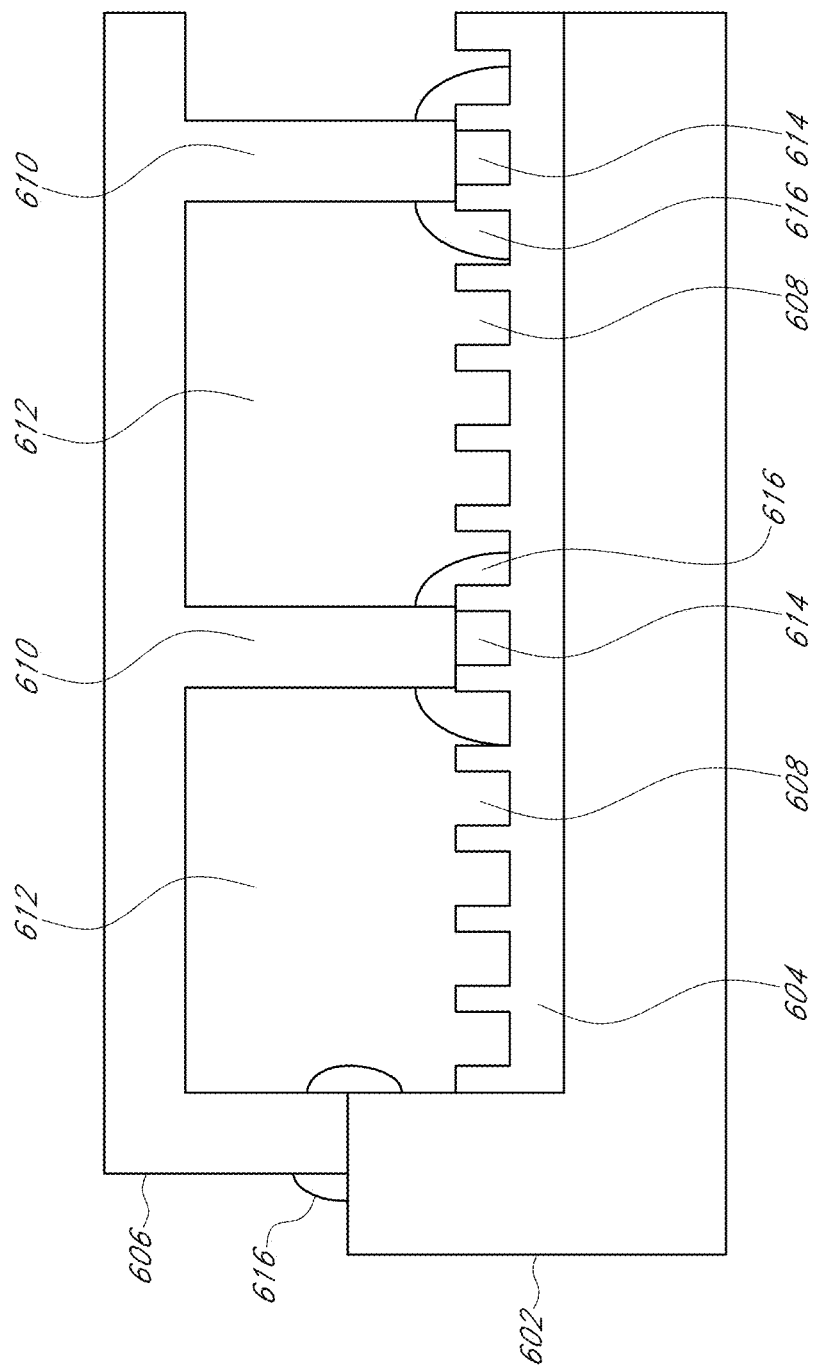
FIG. 6 includes an illustration of a cross-section of the example sensor device.

FIG. 6 includes a further example of a flow cell attached to a substrate. For example, a substrate 602 is attached to a die 604. In an example, the substrate 602 can be secured to the die 604 utilizing semiconductor encapsulation techniques. The die 604 includes a plurality of wells 608 cooperatively associated with sensors, for example, as illustrated in FIG. 3.

Figure 7:
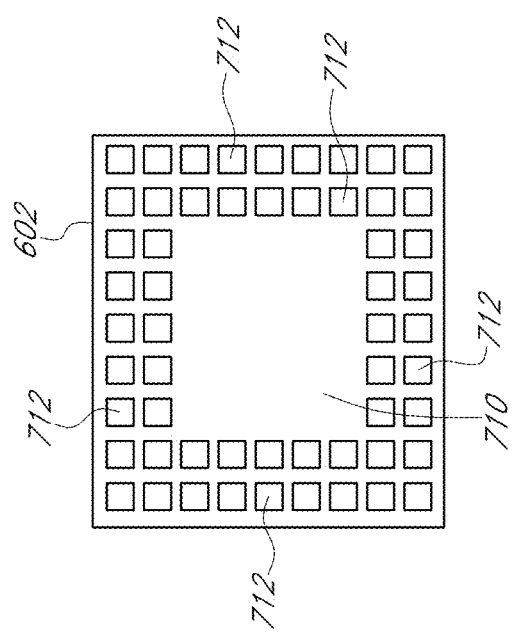
FIG. 7 includes an illustration of an electronic interface of the example sensor device.

Further, substrate 602 can provide an electronic interface to the die 604, for example, as illustrated in FIG. 7. In an example, the substrate 602 includes interface pads 712 distributed around a central area 710 free from interface pads. The interface pads 712 are on a side of the substrate 602 opposite the flow cell 606. In particular, the interface pads 712 are in electrical communication with interface contacts of the die 604. For example, the interface pads 712 can communicate instructions to circuits within the die 604 and can receive data from the circuits within the die 604.

The flow cell 606 can be coupled to the substrate 602. In an example, the flow cell 606 can define a single volume and have a single inlet and a single outlet providing access to the wells 608 of the die 604. In another example, the flow cell 606 can include dividers 610 that separate a space defined over the die 604 into a plurality of separate volumes 612 isolated from one another. In particular, the volumes 612 can form lanes across the die 604.

In particular, the dividers 610 extend to the die 604. For example, the dividers 610 can be disposed over a set of wells, such as wells 614, and at least partially isolate such wells 614 from the separate volumes 612. As such, the use of sensors associated with such wells 614 is limited.

The flow cell 606 can be formed of a variety of polymeric materials. For example, the polymeric material can include polycarbonate, polyethylene, polypropylene, polyamides, ABS, polytetrafluoroethylene, polyvinylidene fluoride, or polyvinylchloride, among other polymeric materials. Optionally, the dividers 610 can include elastomeric material disposed at the tip of the dividers 610. In an example, the elastomeric material can include ABS, butylene rubber, or other elastomers.

The flow cell 606 can be secured to the substrate utilizing mechanical methods. Alternatively, the flow cell 606 can be secured to the substrate 602 using an adhesive 616. In a particular example, the adhesive can be further used to secure the dividers 610 to the die 604. Portions of the adhesive 616 can obscure or enter wells of the array of wells 608 disposed on the die 604, further limiting use of the obscured wells and associated sensors. Example adhesives include silicone adhesives, epoxy, or urethane adhesive, among others.

Figure 8:
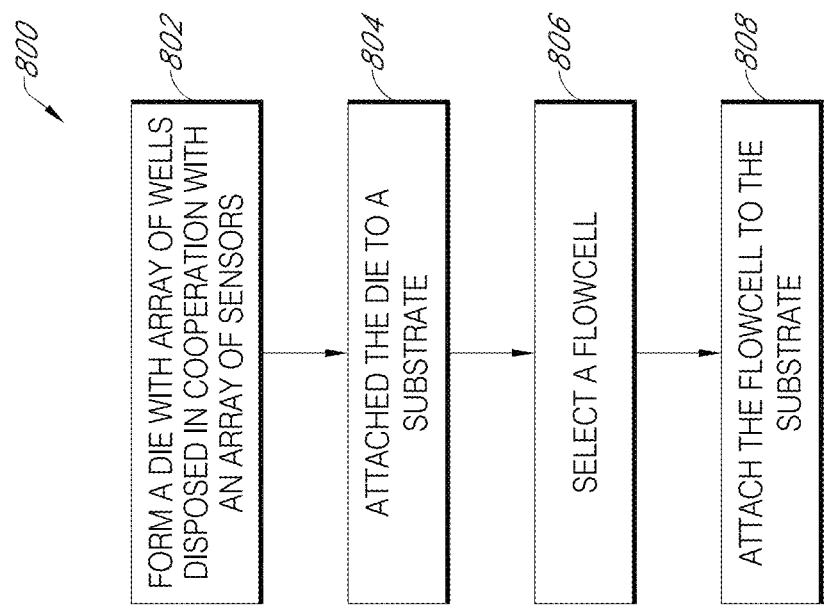
FIG. 8 includes a block flow diagram illustrating an example method for forming a sensor device.

FIG. 8 includes a block flow diagram illustrating an example method 800 for forming a sensor device. For example, the method 800 includes forming a die with an array of wells disposed in cooperation with an array of sensors, as illustrated at block 802. For example, the die can be formed as part of a wafer using conventional semiconductor processing techniques to include sensors on array of sensors, such as those described in relation to FIG. 3. One or more insulative layers be disposed over the die, and an array of wells can be defined through the one or more insulative layers to provide access to electrodes of the array of sensors.

As illustrated at block 804, the die can be attached to a substrate. For example, a wireframe or ball mount be defined or secured to the die and the die encapsulated on the substrate, thus providing an electronic interface through substrate to the sensors of the die.

Optionally, a flow cell can be selected, as illustrated at block 806. For example, a flow cell defining a single volume and having a single inlet and a single outlet can be selected for attachment over the substrate. In another example, a flow cell can be selected that is configured to define a plurality of volumes, each volume of the plurality of volumes having an associated inlet and an associated output. The flow cell can utilize dividers that separate the volumes. For example, the volumes can form lanes when attached to the substrate over the die.

As illustrated at block 808, the flow cell can be attached to the substrate. For example, the flow cell can include mechanical features that interact with complementary features of the substrate to secure the flow cell to the substrate. Alternatively, the flow cell can be adhered to the substrate using an adhesive. Optionally, the dividers of the flow cell can include elastomeric material compressed into the surface of the die. Alternatively, adhesive can be used to secure the dividers of the flow cell to die. In either case, portions of the wells of the die are blocked and the associated sensors have limited use.

In particular, the above method allows for standardization of a semiconductor process and subsequent selection of a configuration of flow cell. Accordingly, only a single type of semiconductor chip may be designed which can have different flow cell configurations associated therewith in contrast to adapting the design of the semiconductor die to a configuration of the flow cell. The different flow cell configurations can include a flow cell with multiple lanes or dividers and optionally, a flow cell configuration without dividers.

In a first aspect, a sensor device includes a substrate having a die attached to the substrate, the die including an array of sensors and an array of wells cooperatively disposed over the array of sensors, the array of wells exposed by the substrate; and a flow cell secured to the substrate and defining a flow space disposed over the die and accessible to the array of wells, the flow cell defining a plurality of separate volumes, each volume of the plurality of separate volumes having an inlet and an outlet, the plurality of separate volumes separated by dividers, the dividers covering a set of wells of the array of wells.

In an example of the first aspect, a sensor of the array of sensors includes a chemical sensitive field effect transistor. For example, the chemical sensitive field effect transistor is an ion-sensitive field effect transistor.

In another example of the first aspect and the above example, the sensor device further includes an adhesive securing the flow cell to the substrate. For example, the adhesive secures the dividers to the die, the adhesive covering the set of wells.

In a further example of the first aspect and the above example, the set of wells are fluidically isolated from the plurality of separate volumes.

In an additional example of the first aspect and the above example, the flow cell includes a guide structure.

In another example of the first aspect and the above example, the plurality of separate volumes define lanes across the die. For example, a number of lanes is at least 2 and not greater than 10. In an example, the number of lanes is at least 3 and not greater than 6.

In a second aspect, a method of preparing a sensor device includes providing a die attached to a substrate, the die including an array of sensors and an array of wells cooperatively disposed over the array of sensors, the array of wells exposed by the substrate; selecting a flow cell to apply to the substrate to form a flow space disposed over the die and accessible to the array of wells, the flow cell defining a plurality of separate volumes, each volume of the plurality of separate volumes having an inlet and an outlet, the plurality of separate volumes separated by dividers; and applying the flow cell to the substrate, the dividers covering a set of wells of the array of wells.

In an example of the second aspect, a sensor of the array of sensors includes a chemical sensitive field effect transistor. For example, the chemical sensitive field effect transistor is an ion-sensitive field effect transistor.

In another example of the second aspect and the above examples, applying the flow cell includes adhering the flow cell to the substrate with an adhesive. For example, the adhesive secures the dividers to the die, the adhesive covering the set of wells.

In a further example of the second aspect and the above examples, the set of wells are fluidically isolated from the plurality of separate volumes.

In an additional example of the second aspect and the above examples, the flow cell includes a guide structure.

In another example of the second aspect and the above examples, the plurality of separate volumes define lanes across the die. For example, a number of lanes is at least 2 and not greater than 10. In an example, the number of lanes is at least 3 and not greater than 6.

Note that not all of the activities described above in the general description or the examples are required, that a portion of a specific activity may not be required, and that one or more further activities may be performed in addition to those described. Still further, the order in which activities are listed are not necessarily the order in which they are performed.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

After reading the specification, skilled artisans will appreciate that certain features are, for clarity, described herein in the context of separate embodiments, may also be provided in combination in a single embodiment. Conversely, various features that are, for brevity, described in the context of a single embodiment, may also be provided separately or in any subcombination. Further, references to values stated in ranges include each and every value within that range.

What is claimed is:

1. A sensor device comprising:
   a substrate having a die attached to the substrate, the die including an array of sensors and an array of wells cooperatively disposed over the array of sensors;
   a flow cell cover secured to the substrate and defining a flow space disposed over the die, the flow space in fluid communication with the array of wells, the flow cell cover including dividers dividing the flow space into a plurality of separate volumes, each volume of the plurality of separate volumes having an inlet and an outlet; and
   adhesive securing the flow cell cover to the substrate and the die, wherein the adhesive secures the dividers to the die, the adhesive partially disposed in a set of wells of the array of wells.

2. The sensor device of claim 1, wherein a sensor of the array of sensors includes a chemical sensitive field effect transistor.

3. The sensor device of claim 2, wherein the chemical sensitive field effect transistor is an ion-sensitive field effect transistor.

4. The sensor device of claim 1, wherein the set of wells are fluidically isolated from the plurality of separate volumes.

5. The sensor device of claim 1, wherein the flow cell cover includes a guide structure extending from a top of the flow cell cover to engage complementary structures on a fluidic coupler.

6. The sensor device of claim 1, wherein a number of separate volumes of the plurality of separate volumes is at least 2 and not greater than 10.

7. The sensor device of claim 6, wherein the number of separate volumes of the plurality of separate volumes is at least 3 and not greater than 6.

* * * * *